Patented Aug. 12, 1941

2,252,588

UNITED STATES PATENT OFFICE 2,252,588

VITREOUS ENAMEL OPACIFIER

Robert J. Whitesell, Philadelphia, Pa., assignor to Röhm & Haas Company, Philadelphia, Pa.

No Drawing. Application December 21, 1938,
Serial No. 246,998

3 Claims. (Cl. 106—48)

This invention relates to a raw batch opacifier for vitreous enamels and to the preparation of an antimony free white enamel frit which is capable of producing in one coating a final white enamel of sufficient opacity to cover a base coating containing cobalt or nickel.

White enamel cannot be applied directly to steel for the reason that when fused it does not adhere to the steel. It has, therefore, been customary to apply a ground coating of an enamel containing cobalt and nickel which promote adherence and to apply the white enamel to this ground coating. The presence of the nickel and cobalt gives to the ground coating a dark blue color which must be masked by the white enamel. To accomplish this the white enamel must have a reflectance of approximately 65%. There are two general methods of rendering the white enamel opaque. An opacifier may be added to the raw batch of the frit and smelted into the frit or an opacifier may be added during the milling of the frit with clay, electrolytes, etc., in the preparation of the enamel slip. An opacifier when added to the raw batch of the frit is commonly referred to as a raw batch opacifier and the one most commonly used is antimony oxide. An opacifier adapted to be added in the preparation of the slip is commonly called a mill opacifier.

There are in use commercial frits containing around 10% antimony oxide which have sufficient opacity to be used in one coat applications, but except by using antimony it has heretofore not been possible to prepare a frit having that degree of opacity. For certain purposes, particularly in the field of enameled kitchenware, the use of antimony as opacifier is objectionable for the reason that many food acids etch the enameled surface and dissolve out appreciable quantities of antimony. Several severe cases of antimony poisoning have been traced to the eating of acid foods cooked in pans coated with high antimony enamels. Since it has not been possible by using other opacifiers to obtain a workable enamel that will give in one coating the minimum reflectance for satisfactory coverage, the art has been obliged to resort to a two coat process wherever an antimony free enamel is desired.

The object of this invention is to provide an antimony free enamel frit having sufficient opacity to permit its being used in a one coat process. A further object is to provide such a frit using zirconium as the opacifier. A still further object is to provide a zirconium opacifier which may be used in the conventional way but which will produce a greater reflectance than has heretofore been obtainable with zirconium opacifiers.

These objects have been accomplished through the discovery that when aluminum phosphate is used in conjunction with a zirconium opacifier in the preparation of the frit, a much higher reflectance is obtained than is obtainable with a zirconium opacifier alone. It has been found that by adding as low as 0.25% aluminum phosphate to a raw batch containing from 5 to 10% zirconia a substantial increase in the reflectance is obtained. A further increase is obtained as the amount of aluminum phosphate is increased up to about 4% but amounts greater than this are not recommended because of increased refractoriness and deleterious effect on surface texture. Based on the zirconia content of the frit, I prefer to use an amount of aluminum phosphate equivalent to from 20 to 25% but obtain increased opacity with as little as 2.5% or as much as 40%.

In place of pure aluminum phosphate natural occurring aluminum phosphate minerals may be used. Of particular merit is the mineral amblygonite which basically is an aluminum phosphate-lithium fluoride mixture. The lithium fluoride in this mixture increases fusibility sufficiently to compensate for the increased refractoriness caused by the aluminum phosphate and while other materials may be used to compensate for this refractoriness, the naturally occurring amblygonite is an ideal economical combination.

The zirconium compound used to impart opacity may be any zirconium compound which during smelting forms the oxide. Among these may be mentioned the oxide itself, various zirconates, and the silicate, which for economical reasons is preferred. When using zirconium silicate as the opacifier and amblygonite as the source of aluminum phosphate they may be mixed in the ratio of from 5 to 35 parts amblygonite to from 65 to 95 parts zirconium silicate and used in amounts such that the frit contains from about 7 to 15% of zirconium silicate. A very satisfactory mixture consists of approximately 20–25% amblygonite and from 75 to 80% zirconium silicate. It is, however, not necessary to mix the aluminum phosphate containing material with the zirconium opacifier before adding the latter to the raw batch. They may be added in either order or together and the primary advantage of mixing the two prior to adding them to the raw batch is that uniformity is thereby more easily obtained.

In practicing the invention no change is necessary in the formulation and working of the frit. Preferably in addition to the raw batch opacifier a mill opacifier is also used. In this way a reflectance of as high as 70% may be readily obtained in a single coating. In contrast to most enamels those made in accordance with the present invention develop additional opacity on refiring. This may be due to the aluminum phosphate functioning simply as nuclei upon which crystallization of the zirconia takes place and from the fact that the frits made in accordance with the present invention are almost transparent and develop opacity during the firing of the enamel, this seems to explain the action of the aluminum phosphate.

To further illustrate the invention the following example is given.

Comparative raw batches were prepared having the following percent compositions:

|  | Control | A | B |
| --- | --- | --- | --- |
| Dehydrated borax | 14.66 | 14.23 | 14.42 |
| Pyrophyllite | 34.47 | 33.46 | 33.91 |
| Flint | 8.24 | 8.00 | 8.11 |
| Cryolite | 16.91 | 16.42 | 16.64 |
| Fluorspar | 2.53 | 2.46 | 2.49 |
| Sodium nitrate | 1.86 | 1.81 | 1.83 |
| Whiting | 4.30 | 4.17 | 4.23 |
| Boric acid | 6.62 | 6.43 | 6.52 |
| Zirconium silicate | 10.41 | 10.11 | 10.24 |
| Amblygonite |  | 2.91 |  |
| Aluminum phosphate |  |  | 1.61 |

The oxide analysis of the melted batch was:

|  | Control | A | B |
| --- | --- | --- | --- |
| $Na_2O$ | 13.06 | 12.75 | 12.85 |
| $Li_2O$ |  | .25 |  |
| $CaO$ | 4.36 | 4.23 | 4.29 |
| $Al_2O_3$ | 11.33 | 11.70 | 11.83 |
| $SiO_2$ | 39.24 | 38.28 | 38.60 |
| $B_2O_3$ | 14.31 | 13.90 | 14.08 |
| $ZrO_2$ | 6.97 | 6.77 | 6.85 |
| $F$ | 10.73 | 10.50 | 10.55 |
| $P_2O_5$ |  | 1.62 | .95 |

Each raw batch was smelted at 2100° F. and then quenched by being discharged directly into water. Two enamel slips were prepared from each frit thus obtained. One of the slips from each frit was made without the addition of mill opacifier. The other slip from each frit was made with 4% added zirconium oxide mill opacifier. Enamels were made from these slips by applying them 45 grams to the square foot and firing at 1620° F. for two minutes. The reflectance of each enamel was measured and found to be:

|  | Percent reflectance | | |
| --- | --- | --- | --- |
|  | Control | A | B |
| No mill opacifier | 48.7 | 60.8 | 57.1 |
| 4% zirconium oxide opacifier | 61.1 | 68.6 | 65.8 |

On refiring the enamels of frit A at 1560° F. for two minutes, the reflectance increased to 64.0% in the case where no mill opacifier was added and to 70.3% in the case where the 4% mill opacifier was added.

In place of the zirconium oxide opacifier used as mill opacifier in the foregoing example, other well known opacifiers such as tin oxide may be used. If the total absence of antimony is not required antimony opacifiers may also be used.

As is well known in the art, the workability of an enamel frit and the gloss and acid resistance of the enamel can be varied over wide limits by changes in the glass forming ingredients of the raw batch. Such changes have their effect upon the reflectance of the opacified enamel so that the reflectance given in the example is not totally independent of the whole composition of the enamel. The increase in reflectance obtained by the addition of aluminum phosphate does not, however, depend upon the specific composition used to illustrate the invention. Variations and changes in those oxide constituents which are known to be without effect upon the development of normal zirconia opacity do not greatly alter the beneficial effects of the aluminum phosphate. In a large number of tests using wide variations in the composition of the glass the opacity imparted by up to 10% zirconium oxide in the frit was increased by the inclusion of aluminum phosphate.

I claim:

1. The process of producing an enamel frit which comprises adding to the glass forming materials of the raw batch zirconium silicate and aluminum phosphate in such proportions that the mixture contains from 7 to 15% zirconium silicate and from 0.25 to 4% aluminum phosphate.

2. A raw batch opacifier for vitreous enamels comprising from 65 to 95% zirconium silicate and from 5 to 35% amblygonite.

3. A raw batch opacifier for vitreous enamels containing from 75 to 80% zirconium silicate and from 20 to 25% amblygonite.

ROBERT J. WHITESELL.

DISCLAIMER 2,252,588.—*Robert J. Whitesell*, Philadelphia, Pa. VITREOUS ENAMEL OPACIFIER. Patent dated August 12, 1941. Disclaimer filed April 17, 1943, by the assignee, *Röhm & Haas Company*.

Hereby enters this disclaimer to claim 1 of said patent.

[*Official Gazette May 18, 1943.*]